United States Patent
Choi

(10) Patent No.: US 6,230,077 B1
(45) Date of Patent: May 8, 2001

(54) CAR GLASS MOUNTING SYSTEM

(75) Inventor: Jong-Bum Choi, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/420,240

(22) Filed: Oct. 19, 1999

(30) Foreign Application Priority Data

Dec. 30, 1998 (KR) .................................................. 98-61573

(51) Int. Cl.$^7$ .................................................. G06F 19/00
(52) U.S. Cl. ..................... 700/245; 700/231; 700/25 B; 29/469; 29/470.04; 29/470.05; 29/709; 29/712; 29/714; 156/242; 156/64; 156/244.11; 156/328.11; 52/208; 52/204.595; 296/96.21
(58) Field of Search ................................... 700/245, 258, 700/231; 29/469, 407.05, 407.04, 709, 712, 721, 824, 714, 791; 156/242, 64, 244.11, 328.1, 362, 366, 378, 356, 364; 52/208, 394, 204.595; 428/122; 296/84.1, 93, 96.21

(56) References Cited

U.S. PATENT DOCUMENTS

| | | | |
|---|---|---|---|
| 4,080,734 | * | 3/1978 | Barbour . |
| 4,582,738 | * | 4/1986 | Kunert .................................. 30/123 |
| 4,776,132 | * | 10/1988 | Gold ....................................... 49/375 |
| 4,789,417 | * | 12/1988 | Komatsu et al. .................... 156/356 |
| 4,875,955 | * | 10/1989 | Fujii ........................................ 156/64 |
| 5,013,077 | * | 5/1991 | Stevens ............................. 296/96.21 |
| 5,083,525 | * | 1/1992 | Riera .................................... 118/106 |
| 5,263,759 | * | 11/1993 | Brodie et al. ....................... 296/84.1 |
| 5,380,575 | * | 1/1995 | Kuster et al. .......................... 428/98 |
| 5,540,946 | * | 7/1996 | De Vries et al. ........................ 427/8 |

FOREIGN PATENT DOCUMENTS

405097077 * 3/1993 (JP) .

* cited by examiner

Primary Examiner—William A Cuchlinski, Jr.
Assistant Examiner—McDieunel Marc

(57) ABSTRACT

A car glass mounting system includes a glass-species classifying and glass feeding device. The glass-species classifying and glass feeding device is loaded with species-classified front and rear glasses each with a glass spacer to automatically select and feed the required species of front and rear glasses onto a glass serve line. A glass spacer separating device separates the glass spacers from the front and rear glasses fed through the glass serve line. A glass lifting and positioning device correctly controls positions of the front and rear glasses fed through the glass serve line. A glass lifting and turning device correctly controls positions of the front and rear glasses fed through the glass serve line such that the front glass is attached with a first rubber dam and a room mirror, and the rear glass is attached with a second rubber dam. A primer coating device coats primer onto the front and rear glasses fed through the glass serve line while amending the coating positions of the front and rear glasses such that the primer coating layer is tightly attached with a sealer coating layer to be subsequently coated. A glass unloading and loading device unloads the front and rear glasses fed through the glass serve line and loads the front and rear glasses onto a carriage. A sealer coating and glass mounting device coats sealer onto the primer coated positions of the front and rear glasses fed through the carriage, and mounts the sealer-coated front and rear glasses within a car body.

10 Claims, 21 Drawing Sheets

CAR GLASS MOUNTING SYSTEM

BACKGROUND OF THE INVENTION

1. Field of the Invention

The present invention relates to a car glass mounting system and, more particularly, to a car glass mounting system which can automatically feed various species of front and rear glasses at suitable places in a sequential manner and mount them within car bodies.

2. Description of the Related Art

Generally, a car is provided with a front window glass mounted within a car body at the front side and a rear window glass mounted within the car body at the rear side.

When a car glass mounting system performs the operation of mounting such front and rear window glasses within the car body, the glass mounting process includes the steps of classifying glass-species, feeding the species-classified glasses to a work line, putting the glasses onto suitable work places, coating the glasses with sealers and primers, and fitting the glasses into the car body.

In such a process, up to now, all of the processing steps except for the sealer and primer coating step should have been manually performed by many workers. That is, a worker first loads glasses on a pallet according to relevant specifications. Thereafter, another worker carries the pallet to a work line by using a toe motor and unloads the glass-loaded pallet there. Then, still another worker puts the glasses onto the suitable work places.

Due to such complex processing steps where automatic and manual operations are co-existent, stream of articles becomes complicated and it becomes difficult to acquire a side surplus space in the glass mounting work line so that potential safety problems are present. Furthermore, there is a possibility in such a process that inadequate glasses are fed and mounted into the car body. In addition, as many workers should be involved in the overall process, productivity and product quality may be deteriorated, accompanying with higher production cost.

SUMMARY OF THE INVENTION

It is an object of the present invention to provide a car glass mounting system which can automatically feed various species of front and rear glasses at suitable places in a sequential manner and mount them within car bodies.

It is another object to provide a car glass mounting system which automatically performs the overall car glass mounting process so that productivity and product quality can be elevated at economic cost.

These and other objects may be achieved by a car glass mounting system including a glass-species classifying and glass feeding device. The glass-species classifying and glass feeding device is loaded with species-classified front and rear glasses each with a glass spacer to automatically select and feed the required species of front and rear glasses onto a glass serve line. A glass spacer separating device separates the glass spacers from the front and rear glasses fed through the glass serve line. A glass lifting and positioning device correctly controls positions of the front and rear glasses fed through the glass serve line. A glass lifting and turning device correctly controls positions of the front and rear glasses fed through the glass serve line such that the front glass is attached with a first rubber dam and a room mirror, and the rear glass is attached with a second rubber dam. A primer coating device coats primer onto the front and rear glasses fed through the glass serve line while amending the coating positions of the front and rear glasses such that the primer coating layer is tightly attached with a sealer coating layer to be subsequently coated. A glass unloading and loading device unloads the front and rear glasses fed through the glass serve line and loads the front and rear glasses onto a carriage. A sealer coating and glass mounting device coats sealer onto the primer coated positions of the front and rear glasses fed through the carriage, and finally mounts the sealer-coated front and rear glasses within a car body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
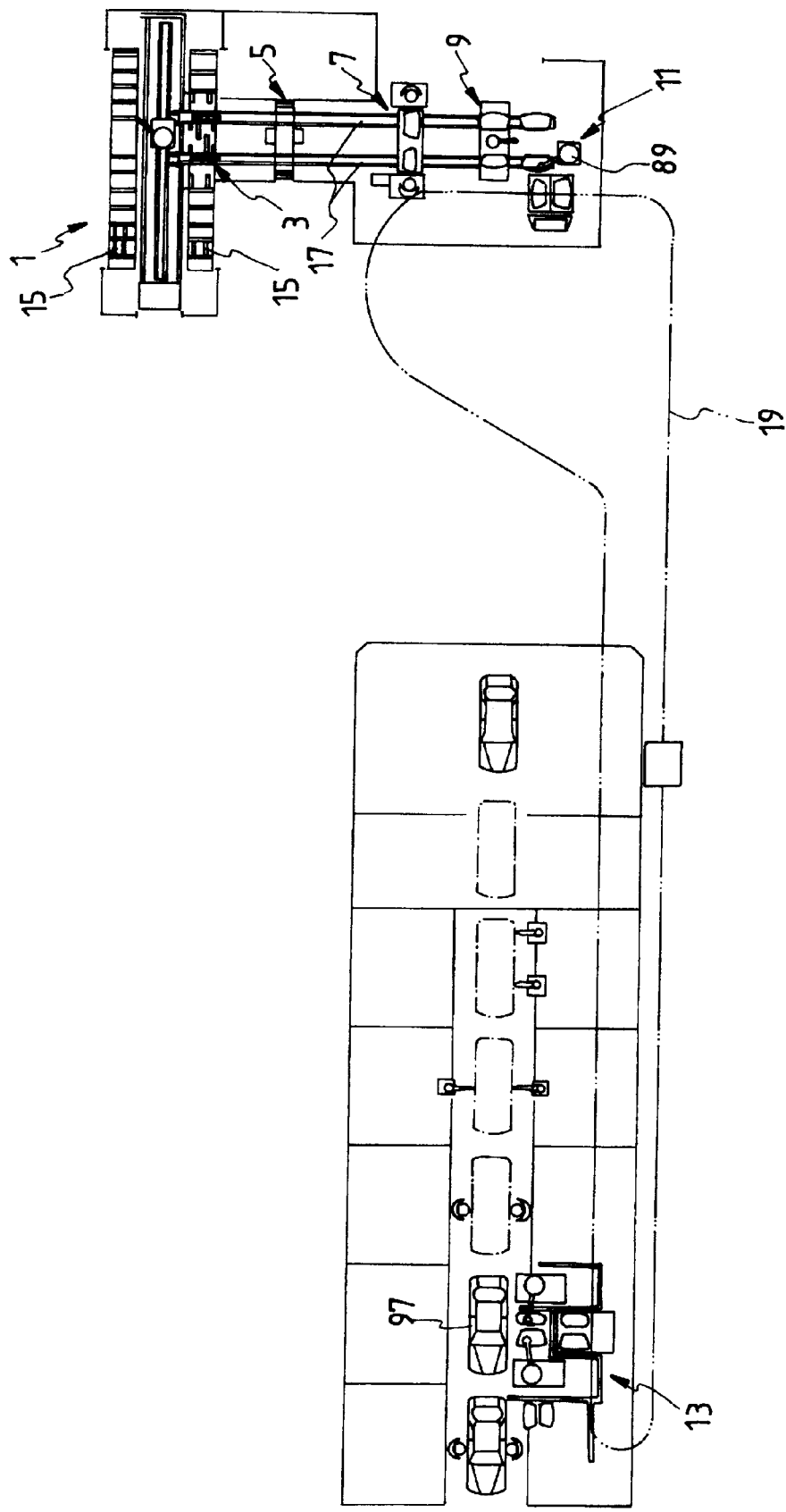
FIG. 1 is a schematic plan view of a car glass mounting system according to a preferred embodiment of the present invention.

FIG. 1 is a schematic plan view of a car glass mounting system according to a preferred embodiment of the present invention. The car glass mounting system enables the overall glass mounting process to be automated.

The car glass mounting process is largely classified into the steps of classifying glass-species and feeding the species-classified front and rear glasses each with a glass spacer to the subsequent processing device, separating glass spacers from the front and rear glasses, and coating primer and sealer onto the front and rear glasses and mounting them within a car body.

Figure 2:
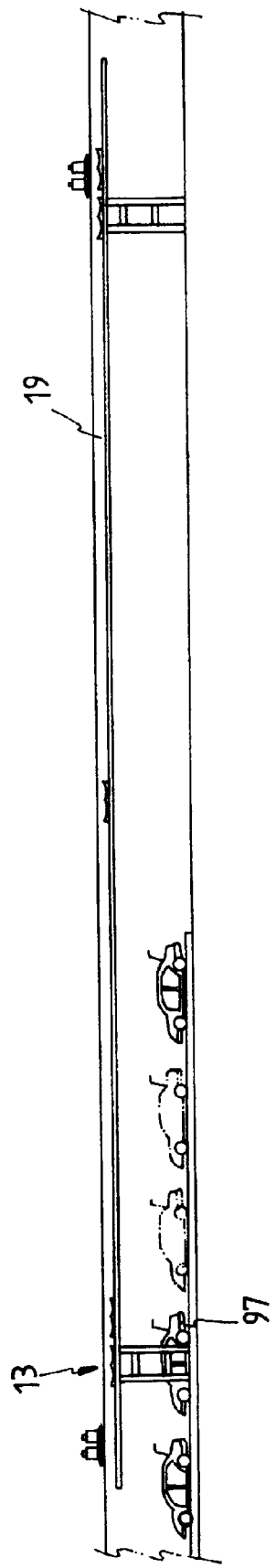
FIG. 2 is a front view of the car glass mounting system shown in FIG. 1.

For this process, as shown in FIGS. 1 and 2, the car glass mounting system includes a glass-species classifying and glass feeding device 1, a glass spacer separating device 3, a glass lifting and positioning device 5, a glass lifting and turning device 7, a primer coating device 9, a glass unloading and loading device 11, a sealer coating and glass mounting device 13, and a glass serve line 17 with conveyers for conveying glasses 15, and a carriage 19 with ram runs.

Figure 3:
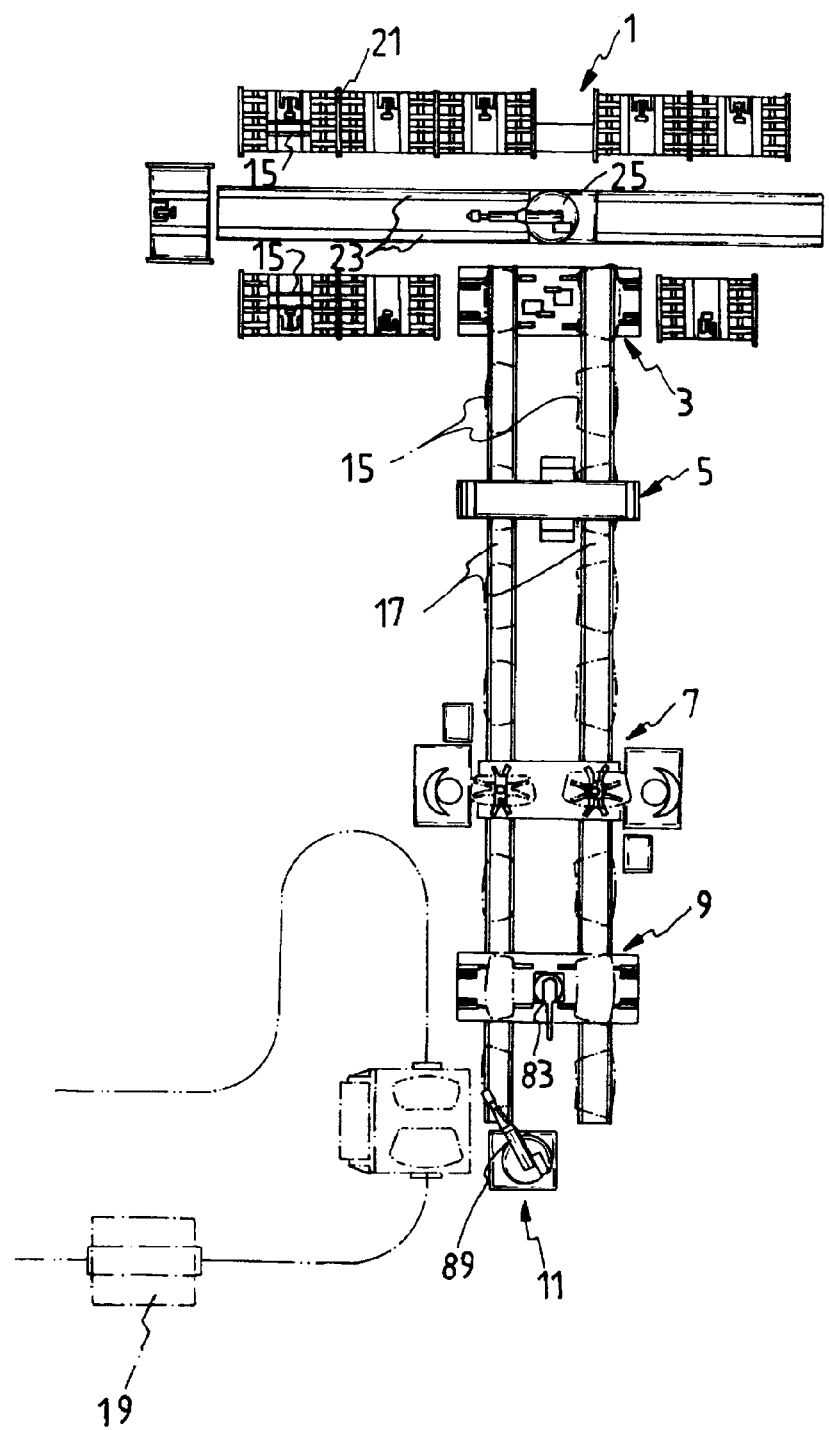
FIG. 3 is a partially amplified view of the car glass mounting system shown in FIG. 1 illustrating a glass-species classifying and glass feeding device, a glass spacer separating device, a glass lifting and positioning device, a glass lifting and turning device, a primer coating device and a glass serve line.
Figure 4:
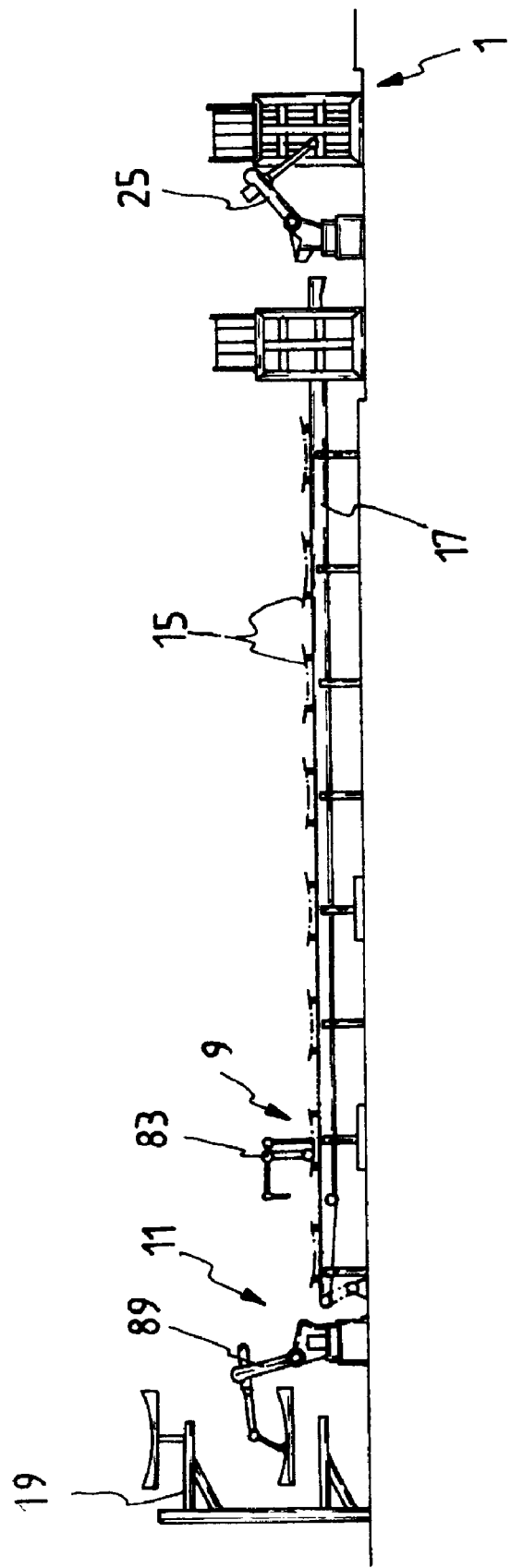
FIG. 4 is a right side view of the car glass mounting system shown in FIG. 3.

FIGS. 3 and 4 specifically illustrate the glass-species classifying and glass feeding device 1, the glass spacer separating device 3, the glass lifting and positioning device 5, the glass lifting and turning device 7, the primer coating device 9 and the glass unloading and loading device 11.

Figure 5:
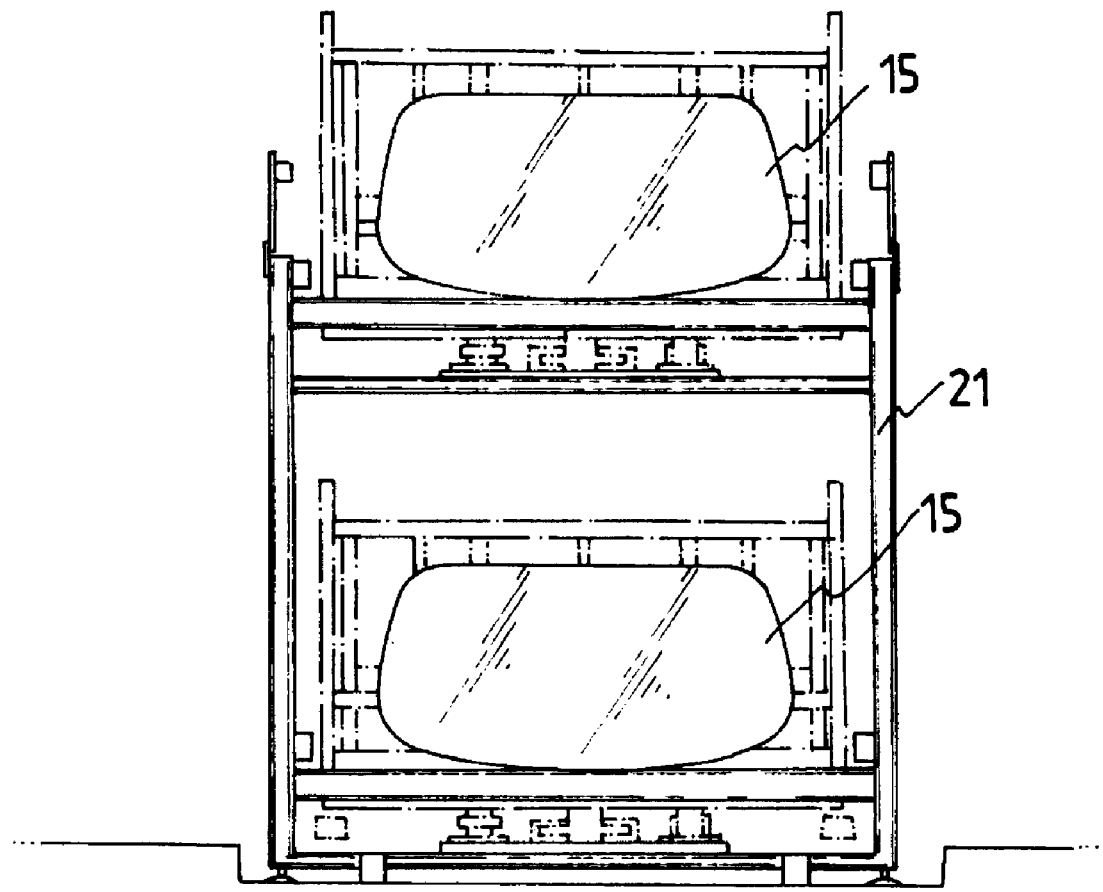
FIG. 5 is a front view of the glass-species classifying and glass feeding device shown in FIG. 3.

As shown in FIG. 5, the glass-species classifying and glass feeding device 1 is loaded with the glasses 15 species-classified according to relevant specifications to automatically select and feed the required front and rear glasses 15 to the subsequent processing device. At this time, each of the front and rear glasses 15 is in a state of being fitted into the glass spacer.

As shown in FIG. 3, the glass-species classifying and glass feeding device 1 includes a stand 21 and a loading robot 25 moving along a guide rail 23. The stand 21 has columns to be loaded with the species-classified glasses 15. The loading robot 25 is jointed with seven axes such that it can grip the glasses loaded on the stand 21 and feed them onto the glass serve line 17 while moving along the guide rail 23.

Figure 6:
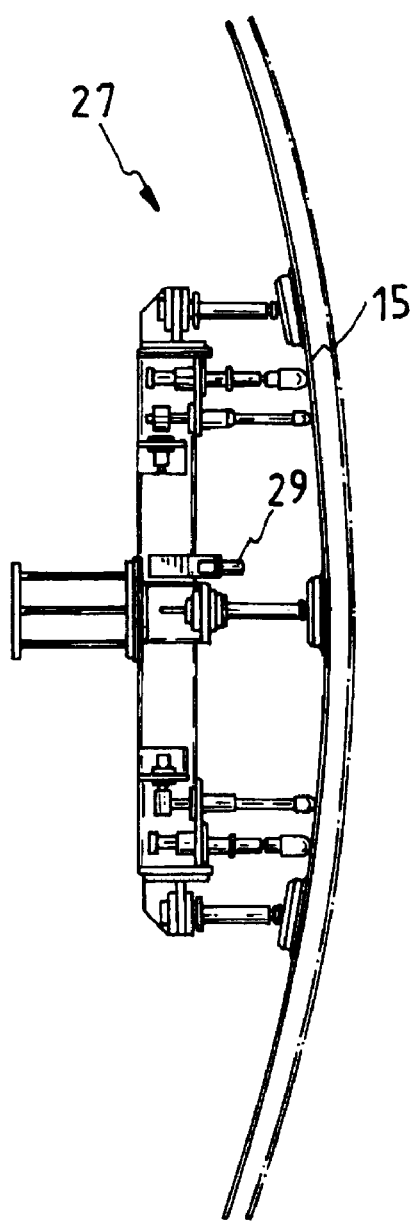
FIG. 6 is an amplified view of the glass-species classifying and glass feeding device shown in FIG. 3 illustrating a gripper.
Figure 11:
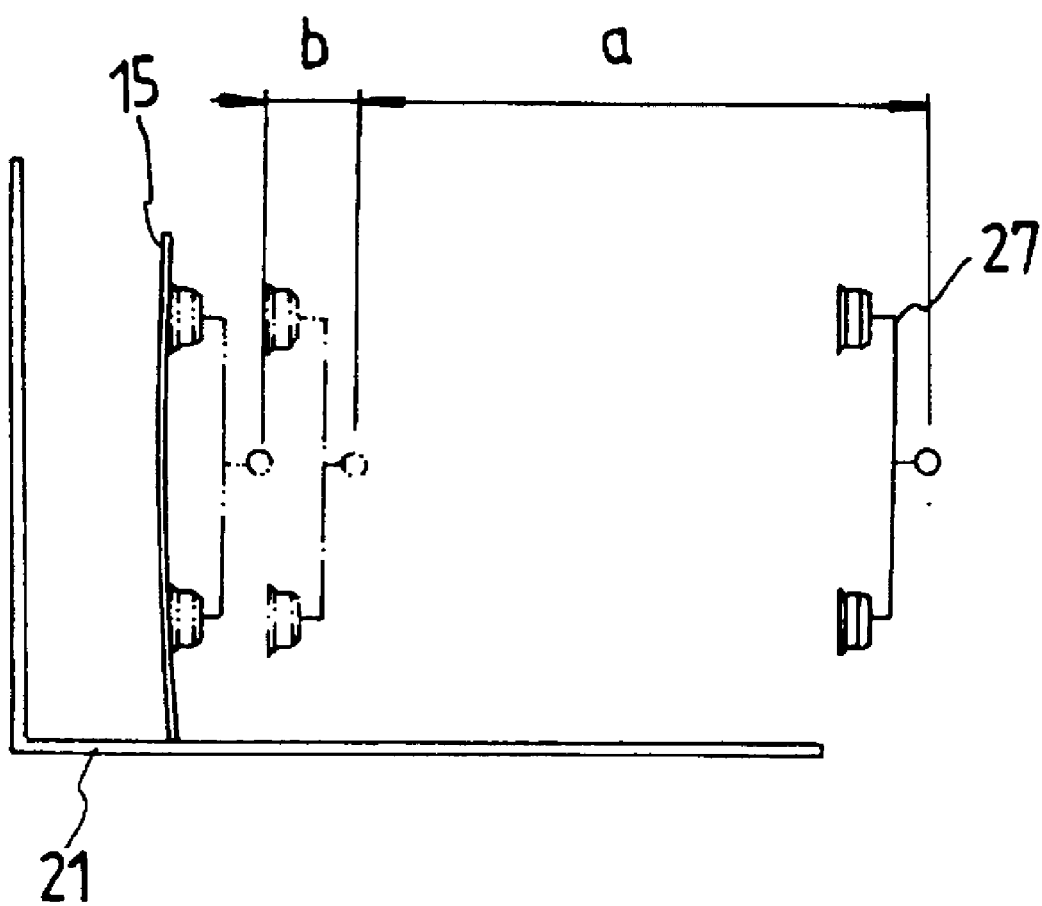
FIG. 11 is a view illustrating an overall operational procedure of the glass-species classifying and glass feeding device shown in FIG. 3.

As shown in FIG. 6, the loading robot 25 has a gripper 27 and an ultrasonic wave sensor 29 provided at a frontal end of the gripper 27. The ultrasonic wave sensor 29 is to sequentially move the gripper 27 forward at high speeds, move it backward at a predetermined distance and again move the gripper 27 forward at low speeds. This is to consider the time required for the transmission of control signals. The glass gripping movements of the loading robot 25 are illustrated in FIGS. 7 to 10 and its overall operational procedure is illustrated in FIG. 11.

Figure 12:
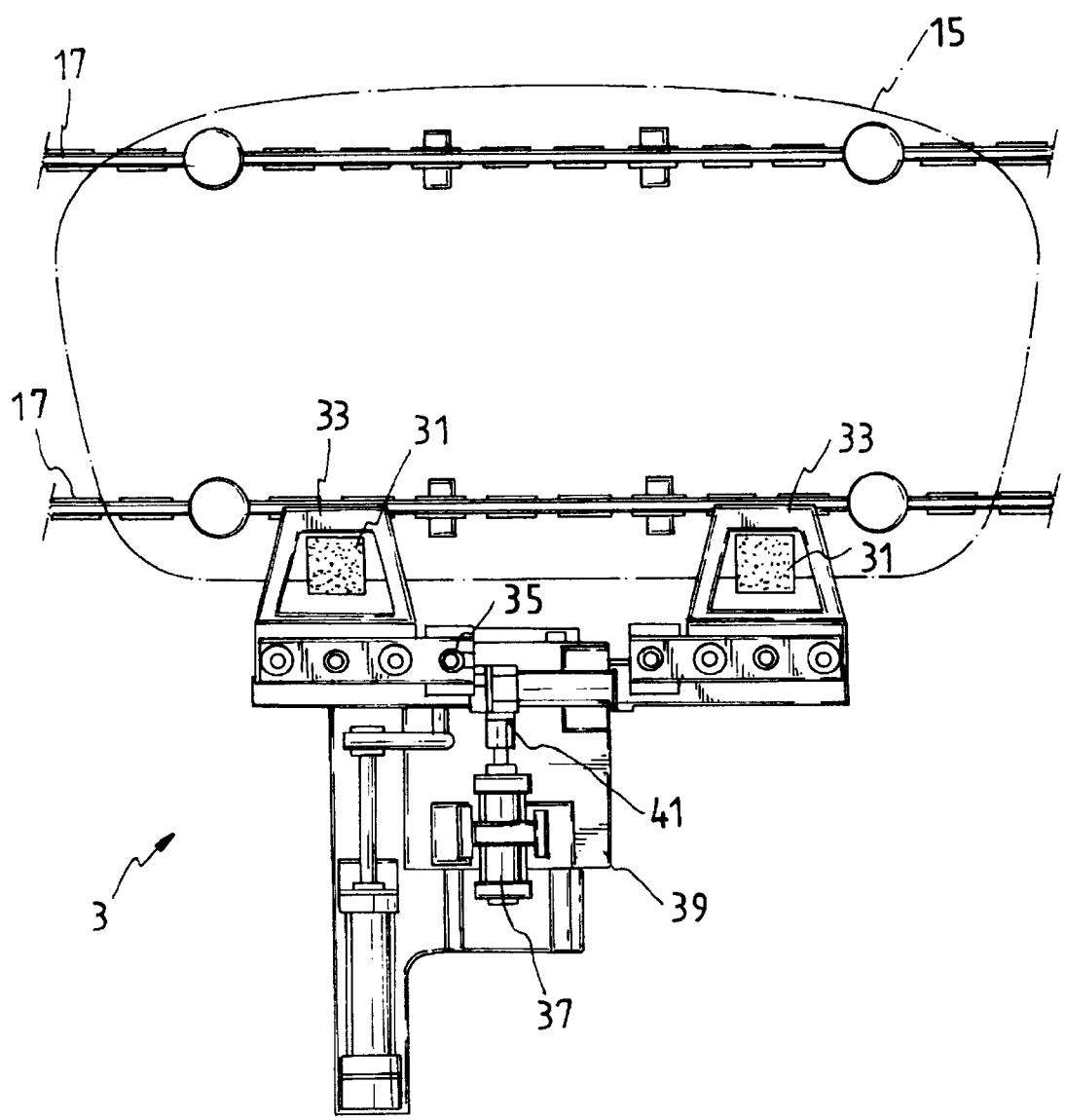
FIG. 12 is a plan view of the glass spacer separating device shown in FIG. 3.
Figure 13:
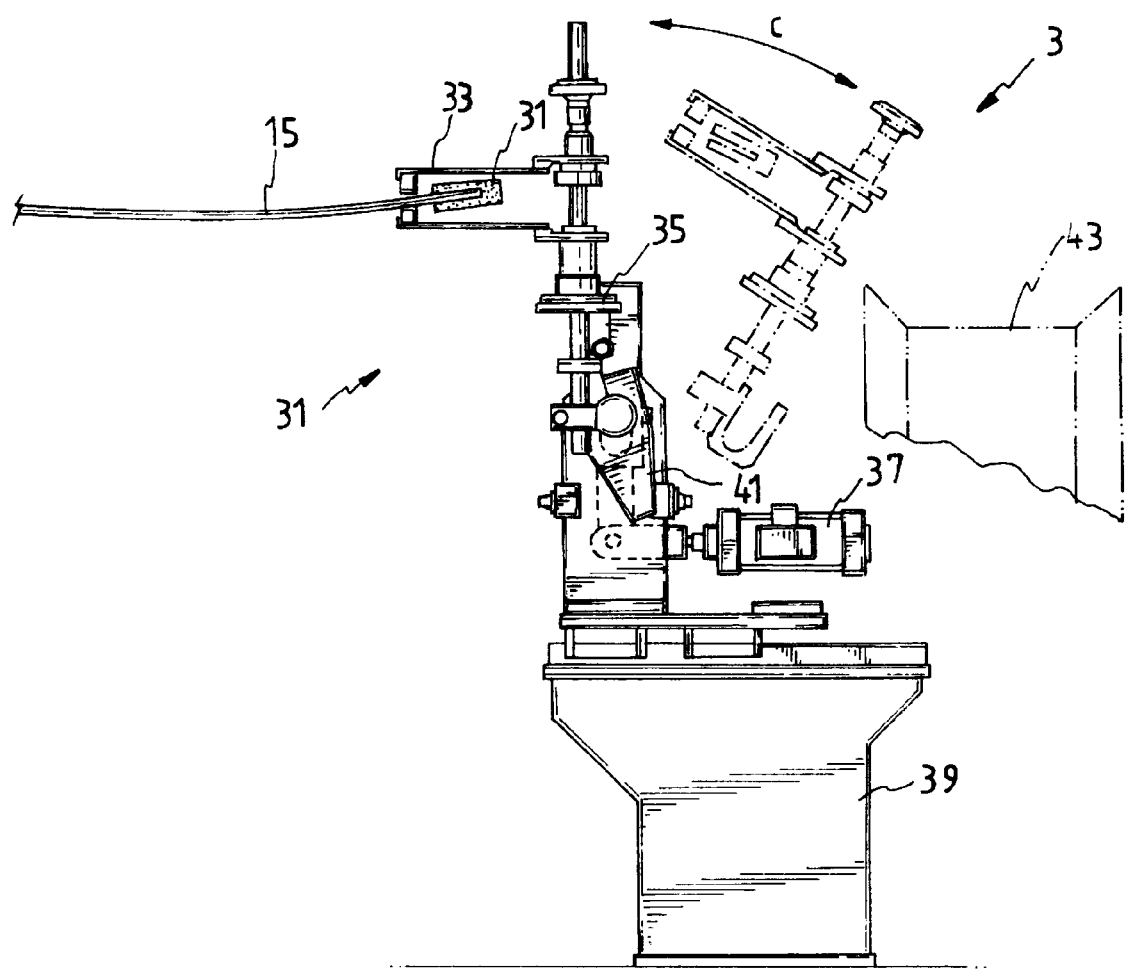
FIG. 13 is a view illustrating an operational state of the glass spacer separating device shown in FIG. 3.

As shown in FIGS. 12 and 13, the glass spacer separating device 3 separates the glass spacers 31 from the front and rear glasses 15 fed from the glass-species classifying and glass feeding device 1 through the glass serve line 17.

The glass spacer separating device 3 includes grippers 33, arms 35, an air pressure cylinder 37 and a base stand 39. The grippers 33 are to grip the glass spacers 31 surrounding the front and rear glasses 15. The arms 35 are fixed on the base stand 39 by interposing a bracket 41 to rotate the gripper 33. The air pressure cylinder 37 is positioned at a side of the bracket 41 to give the arms 35 the required power for rotating the grippers 33.

As shown in FIG. 3, the glass spacer separating device 3 is provided with a guide 43 at the glass spacer dropping position to guide the separated glass spacers 31 for salvation or re-use.

In order to remove the glass spacers from the front and rear glasses in a separate manner, the glass spacer separating device 3 is provided both at the front glass passage side and at the rear glass passage side, respectively.

Figure 14:
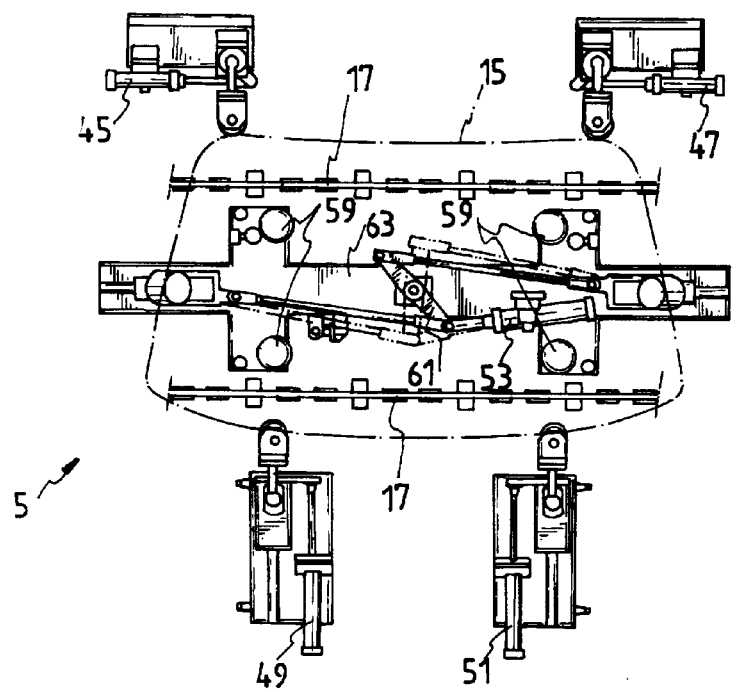
FIG. 14 is a plan view of the glass lifting and positioning device shown in FIG. 3.
Figure 15:
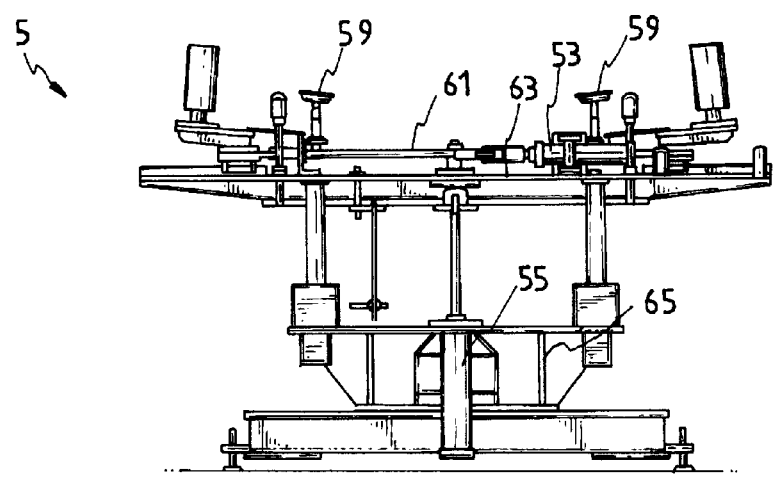
FIG. 15 is a front view of the glass lifting and positioning device shown in FIG. 3.
Figure 16:
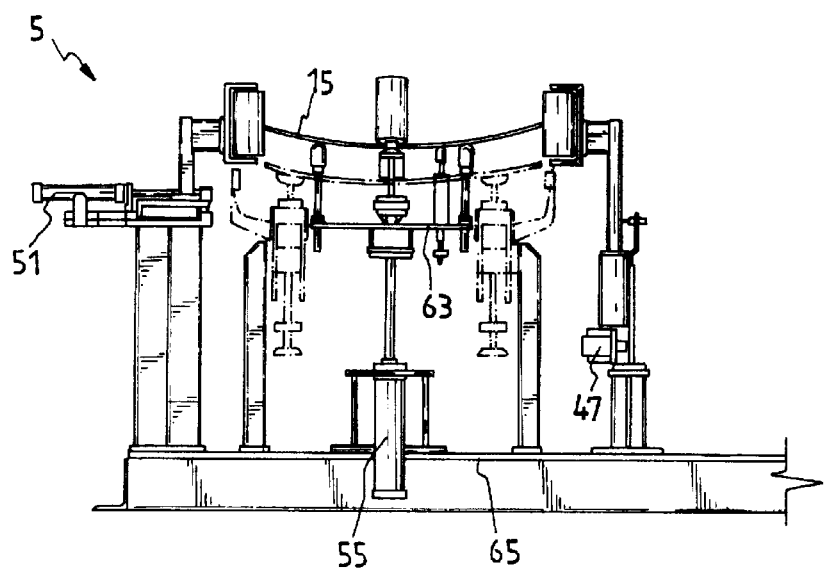
FIG. 16 is a right side view of the glass lifting and positioning device shown in FIG. 3.

As shown in FIGS. 14 to 16, the glass lifting and positioning device 5 controls positions of the front and rear glasses 15 fed through the glass serve line 17 such that the front and rear glasses 15 are placed at their proper places for the subsequent processing step.

The glass lifting and positioning device 5 includes four directional (front, rear, left and right directional) air pressure cylinders 45, 47, 49 and 51, horizontal and vertical air pressure cylinders 53 and 55, and grippers 59. The front and rear air pressure cylinders 45 and 47 are to control front and rear positions of the front and rear glasses 15 fed through the glass serve line 17. The left and right air pressure cylinders 49 and 51 are to control left and right positions of the front and rear glasses 15. The horizontal air pressure cylinder 53 is fixed on a base 63 with a link 61 to define the front and rear positions of the front and rear glasses 15. The vertical air pressure cylinder 55 is fixed on a base stand 65 to move the base 63 in a vertical direction independently of the four directional air pressure cylinders 45, 47, 49 and 51, thereby controlling heights of the front and rear glasses 15. The grippers 59 are to hold the front and rear glasses at their position-controlled places.

In order to control the positions of the front and rear glasses 15 in a separate manner, the glass lifting and positioning device 5 is provided both at the front glass passage side and at the rear glass passage side, respectively.

Figure 17:
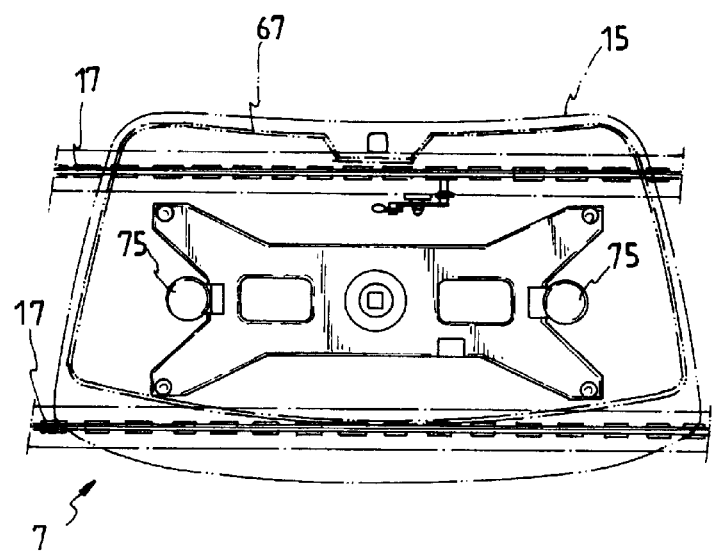
FIG. 17 is a plan view of the glass lifting and turning device shown in FIG. 3.
Figure 18:
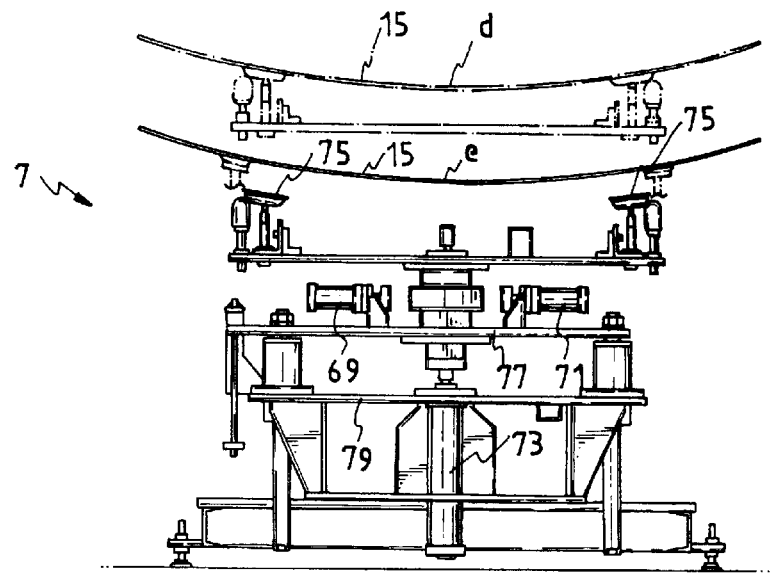
FIG. 18 is a front view of the glass lifting and turning device shown in FIG. 3.
Figure 19:
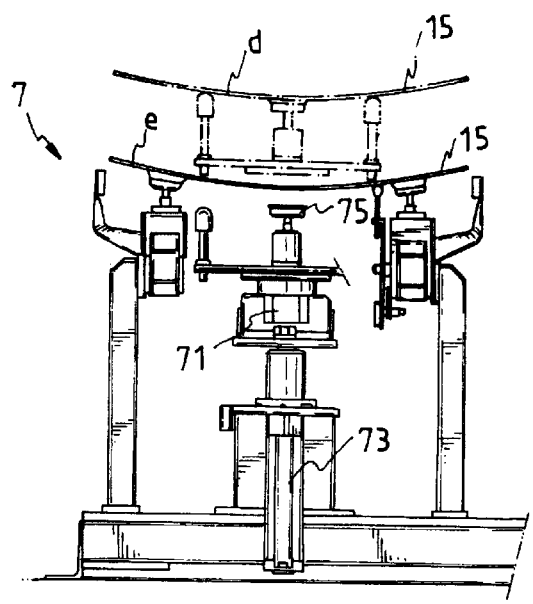
FIG. 19 is a right side view of the glass lifting and turning device shown in FIG. 3.

As shown in FIGS. 17 to 19, the glass lifting and turning device 7 controls positions of the front and rear glasses 15 such that the front glasses 15 fed through the glass serve line 17 are attached with a rubber dam 67 and a room mirror (not shown) and the rear glasses 15 are attached with another rubber dam 67.

The glass lifting and turning device 7 includes first and second horizontal air pressure cylinders 69 and 71, a vertical air pressure cylinder 73 and grippers 75. The first and second horizontal air pressure cylinders 69 and 71 are symmetrically arranged on a base 77 such that as the rubber dam 67 and the room mirror are attached to the front and rear glasses 15, they can control horizontal positions of the front and rear glasses 15. The vertical air pressure cylinder 73 is fixed on a base stand while being connected to the base 77 to move it in a vertical direction. The grippers 75 are to hold the front and rear glasses 15 at their position-controlled places.

In order to control the positions of the front and rear glasses 15 in a separate manner, the glass lifting and turning device 7 is provided both at the front glass passage side and at the rear glass passage side, respectively.

Figure 20:
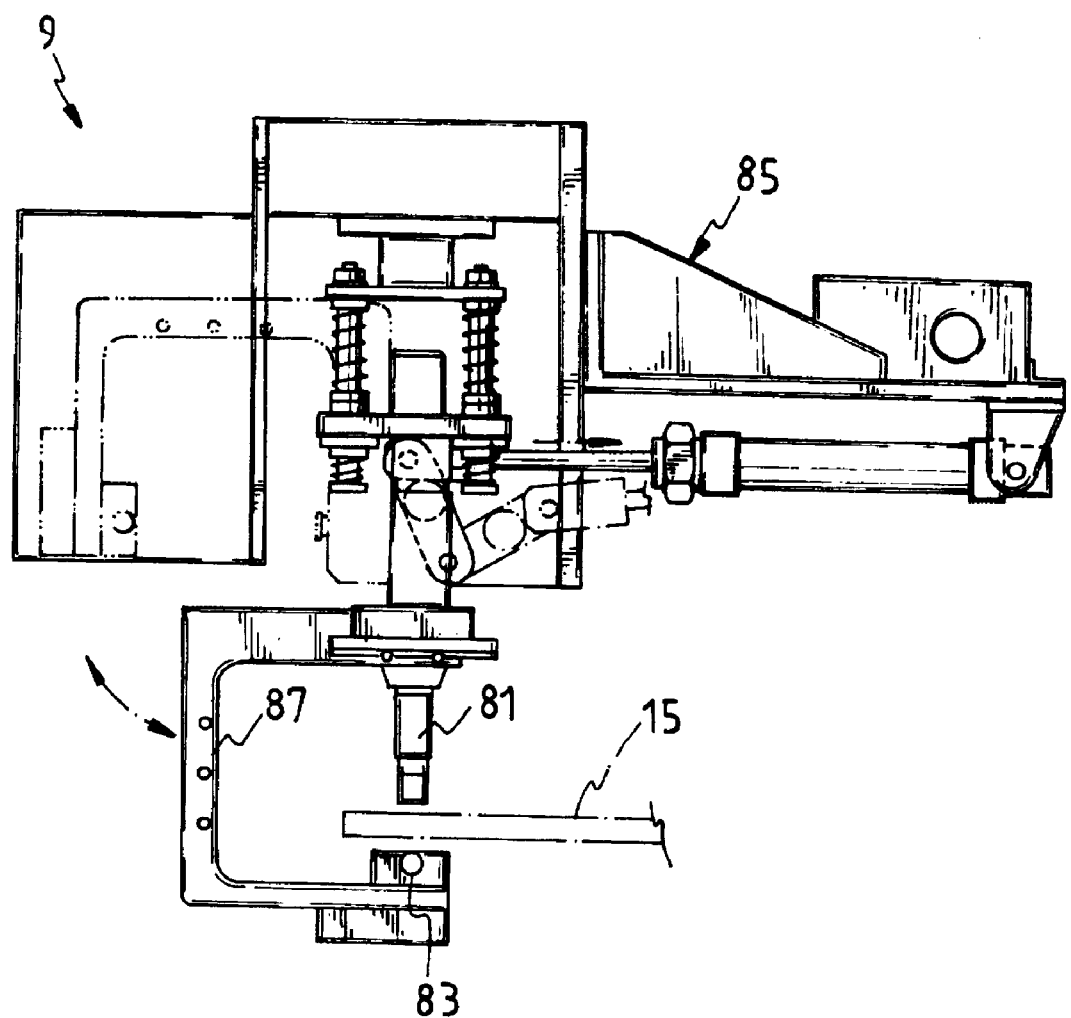
FIG. 20 is a front view of the primer coating device shown in FIG. 3.
Figure 21:
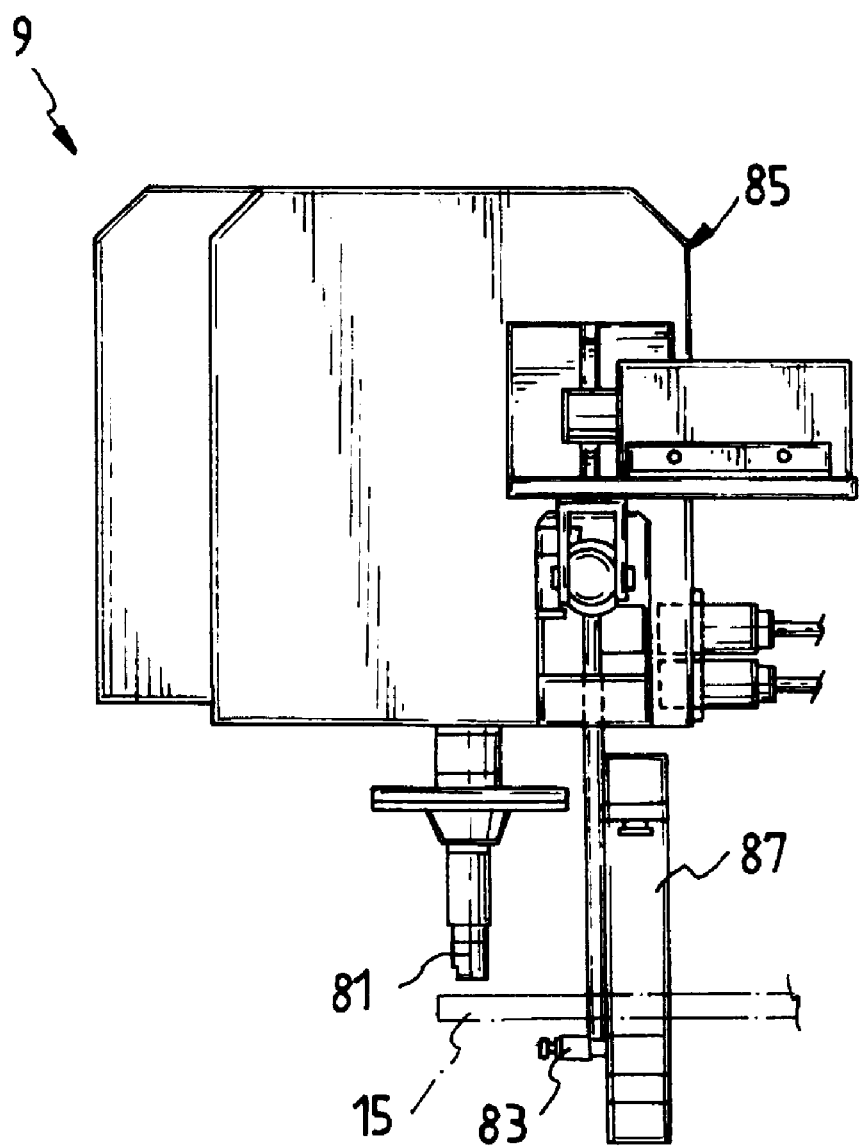
FIG. 21 is a right side view of the primer coating device shown in FIG. 3.

As shown in FIGS. 20 and 21, the primer coating device 9 coats primer onto the front and rear glasses 15 fed through the glass serve line 17 while amending their coating positions such that the front and rear glasses 15 can have sufficient adhesive strengths for being mounted with the car body.

The primer coating device 9 includes a primer gun 81, a primer coating sensor 83 and a primer coating robot 85. The primer gun 81 is to coat primer onto the front and rear glasses 15 fed through the glass serve line 17 such that the primer coated layer can be tightly attached with sealer to be subsequently coated. The primer coating sensor 83 is provided at a bracket 87 such that it senses whether primer issued from the primer gun 83 is coated on the proper positions of the front and rear glasses 15. The primer coating robot 85 is jointed with six axes such that it moves the primer gun 81 to the primer coating positions on the front and rear glasses 15 and amends those positions according to the signals of the primer coating sensor 83.

As shown in FIG. 3, the glass unloading and loading device 11 unloads the front and rear glasses 15 from the glass serve line 17 and loads them onto the carriage 19.

The glass unloading and loading device 11 is provided with an unloading and loading robot 89. The unloading and loading robot 89 is jointed with six axes such that it loads the primer-coated front and rear glasses 15 onto the carriage 19 with the ram-runs.

Figure 22:
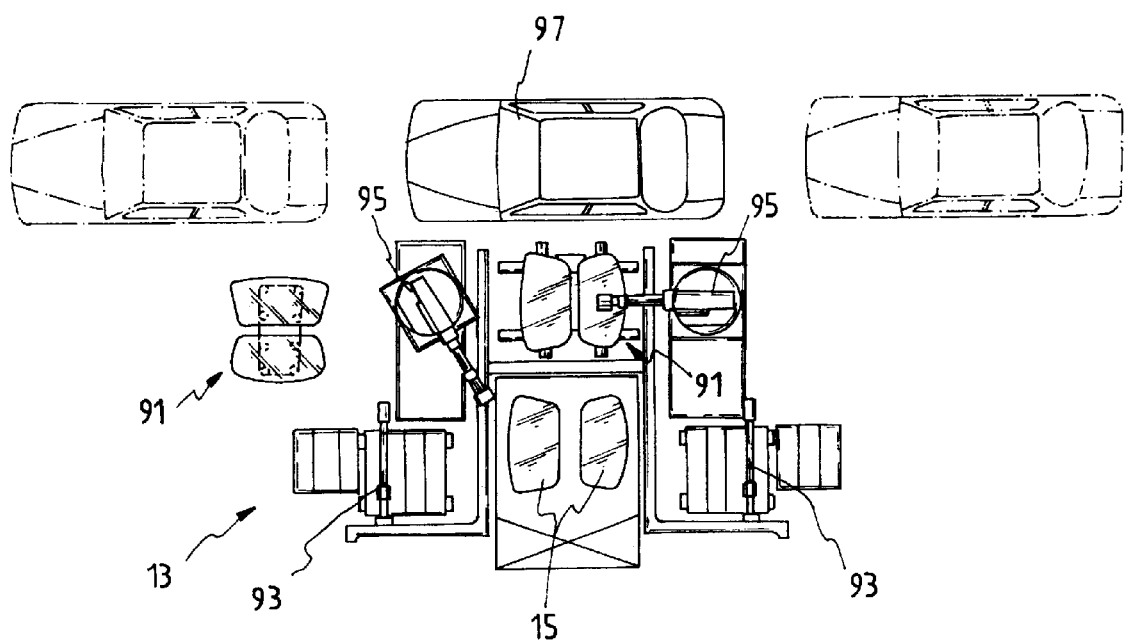
FIG. 22 is a plan view of a sealer coating and glass mounting device of the car glass mounting system shown in FIG. 1.
Figure 23:
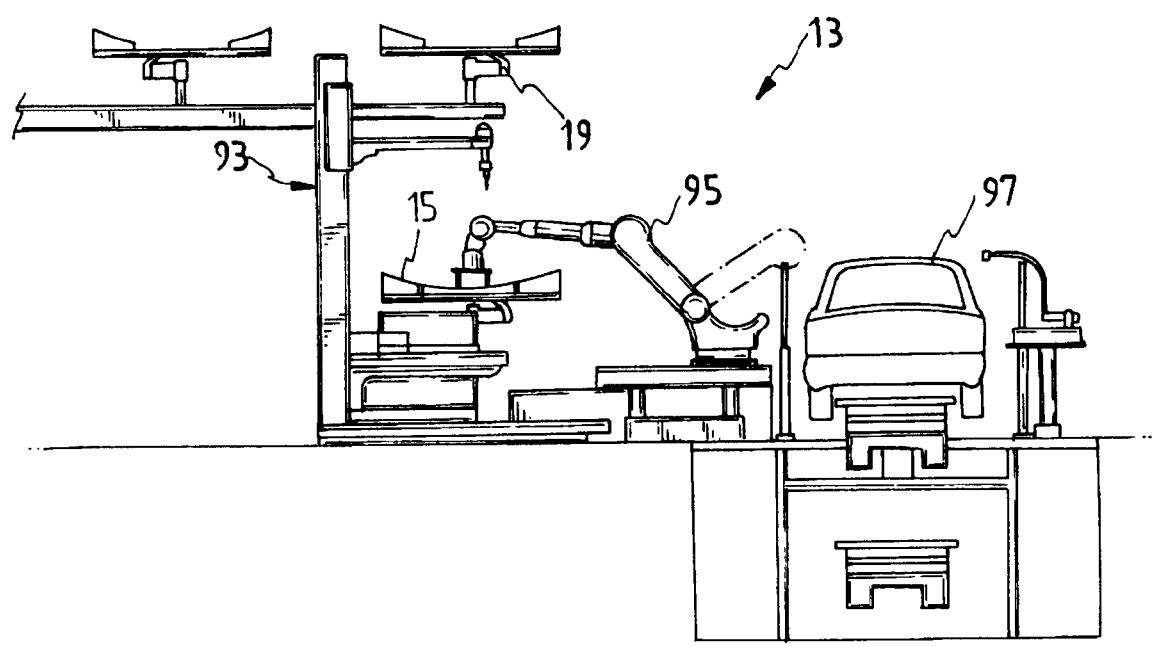
FIG. 23 is a right side view of the sealer coating and glass mounting device shown in FIG. 22.

As shown in FIGS. 22 to 23, the sealer coating and glass mounting device 13 is to coat sealer onto the primer-coated positions of the front and rear glasses 15 fed through the carriage 19, and to mount the sealer-coated front and rear glasses 15 within the car body.

The sealer coating and glass mounting device 13 includes a glass positioning member 91, a sealer coating robot 93 and a glass mounting robot 95.

Figure 24:
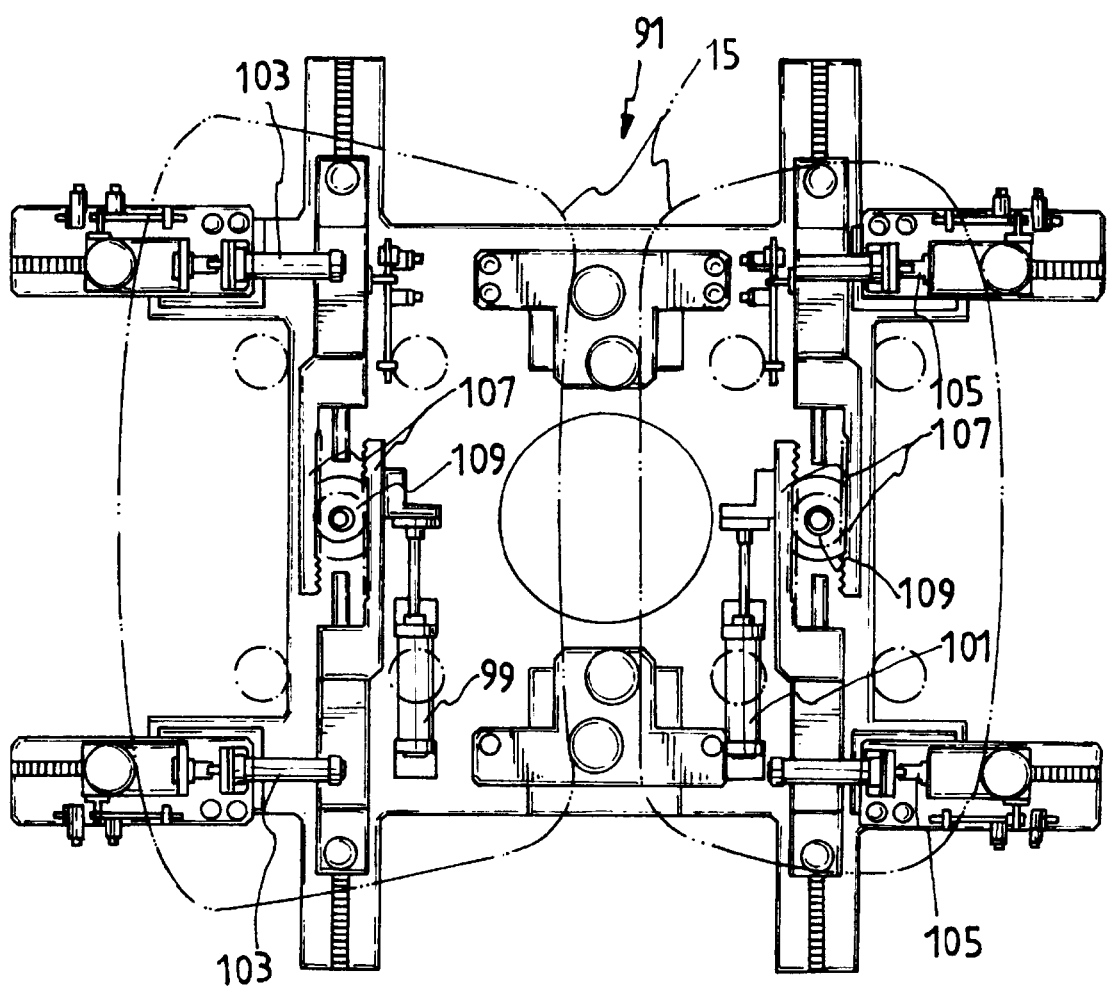
FIG. 24 is a plan view of a sealer positioning member of the sealer coating and glass mounting device shown in FIG. 22.
Figure 25:
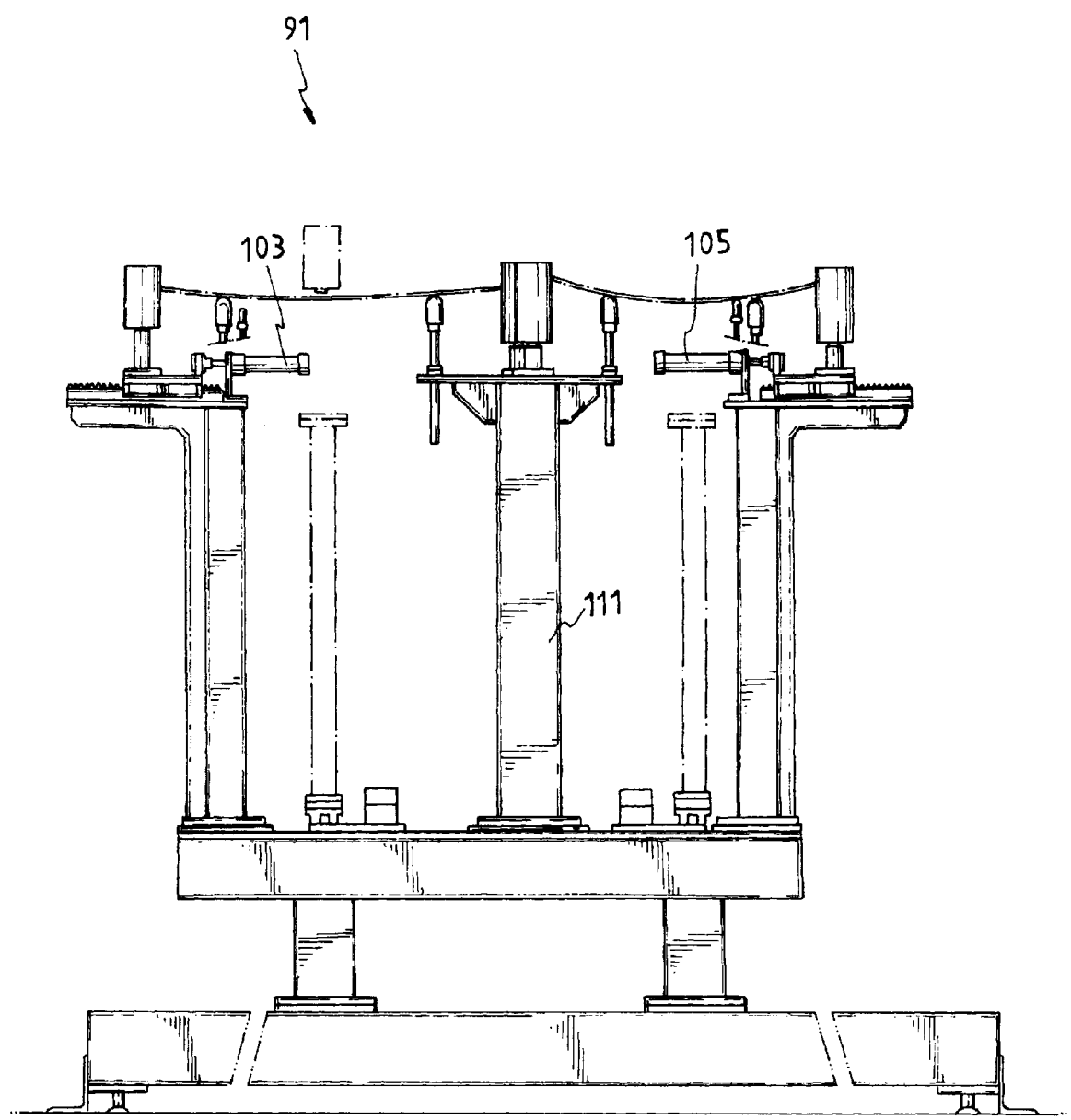
FIG. 25 is a front view of the sealer positioning member shown in FIG. 24.

As shown in FIGS. 24 and 25, the glass positioning member 91 controls positions of the front and rear glasses 15 such that sealer can be coated onto the primer-coated positions of the front and rear glasses 15 and the sealer coated front and rear glasses 15 can be correctly mounted within the car body 97.

The glass positioning member 91 is provided with front and rear air pressure cylinders 99 and 101, and left and right air pressure cylinders 103 and 105. The front and rear air pressure cylinders 99 and 101 are fixed on a base stand 111 by interposing a rack 107 and a pinion 109 such that they control front and rear positions of the front and rear glasses 15. The left and right air pressure cylinders 103 and 105 are fixed on the base stand 111 while being connected to an extended portion of the rack 107 such that the left and right positions of the glasses 15 can be controlled.

In order to control the positions of the front and rear glasses 15 in a separate manner, the glass positioning member 91 is provided both at the front glass passage side and at the rear glass passage side, respectively.

As shown in FIGS. 22 and 23, the sealer coating robot 93 has externally servo double axes such that sealer can be coated onto the primer-coated positions of the front and rear glasses 15 which are controlled by the glass positioning member 91. The glass mounting robot 95 is jointed with six axes such that it moves the front and rear glasses 15 when the sealer coating robot 93 sprays sealer thereonto, and mounts the sealer-coated front and rear glasses 15 within the car body 97.

In order to perform the coating operation with respect to the front and rear glasses 15 in a separate manner, the sealer coating robot 93 and the glass mounting robot 95 are provided each at the front glass passage side and at the rear glass passage side, respectively.

On the basis of the above described components, the overall process of mounting the front and rear glasses 15 within the car body 97 will be described below.

The various species of front and rear glasses 15 delivered are classified and loaded onto the stand 21 of the glass-species classifying and glass feeding device 1 each with a glass spacer 31.

Upon receipt of relevant signals, the loading robot selectively grips the front and rear glasses 15 loaded on the stand 21 and unloads them onto the glass serve line 17.

Figure 7:
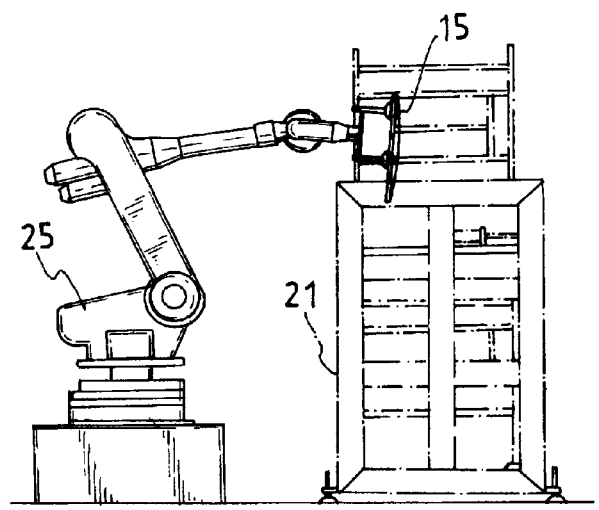
FIG. 7 is a view illustrating an operational state of the glass-species classifying and glass feeding device shown in FIG. 3.
Figure 8:
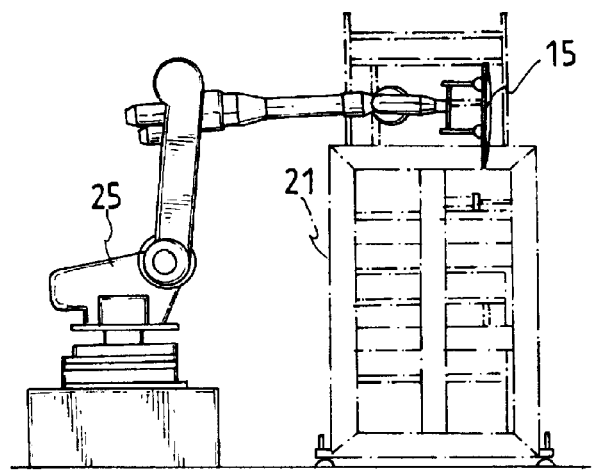
FIG. 8 is a view illustrating another operational state of the glass-species classifying and glass feeding device shown in FIG. 3.
Figure 9:
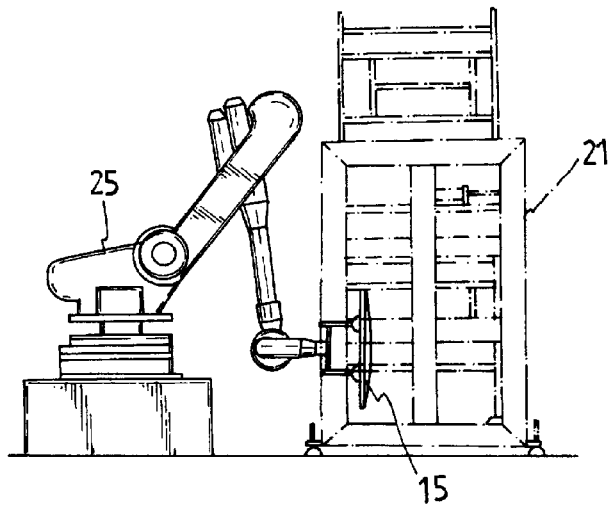
FIG. 9 is a view illustrating still another operational state of the glass-species classifying and glass feeding device shown in FIG. 3.
Figure 10:
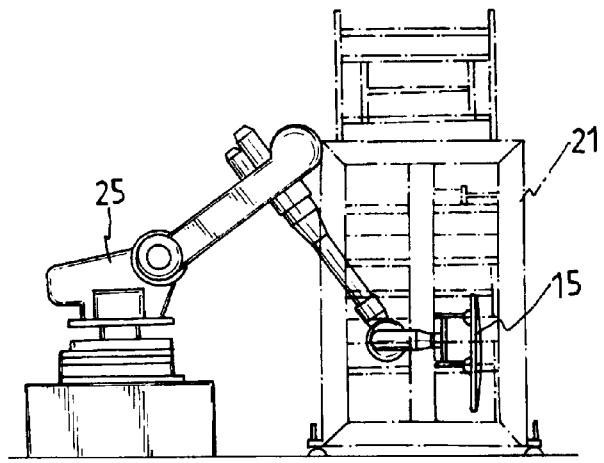
FIG. 10 is a view illustrating still another operational state of the glass-species classifying and glass feeding device shown in FIG. 3.

For example, as with a state shown in FIG. 7, the loading robot 25 grips a first glass from the upper column of the stand 21 while moving along the guide rail 23 and, as with a state shown in FIG. 8, grips a last glass therefrom. Furthermore, as with a state shown in FIG. 9, the loading robot 25 grips a first glass from the lower column of the stand 21 and, as with a state shown in FIG. 10, grips a last glass therefrom.

At this time, the gripper 27 of the loading robot 25 senses its distance from the glass 15 by using an ultrasonic sensor 29 and, as shown in FIG. 11, proceeds at high speeds in the "a" region, retreats by the "b" region and then proceeds speeds, thereby gripping the glass 15.

The loading robot 25 loads the gripped glass 15 onto the glass serve line 17. Thereafter, as shown in FIG. 13, the glass spacer separating device 3 is operated to separate the glass spacer 31 from the glass 15.

The air pressure cylinder 37 is operated to rotate the gripper 33 via the bracket 41 and the arm 35 into the "c" state shown in FIG. 13 and separate the glass spacer 31 from the glass 15. The separated glass spacer 31 is carried through the guide 43 into a separate place for salvation or re-use.

The positions of the front and rear glasses 15 are controlled for the subsequent processing steps by the glass lifting and positioning device 5 shown in FIGS. 14 to 16 and the glass lifting and turning device 7 shown in FIGS. 17 to 19.

In the glass lifting and positioning device 5, the four directional air pressure cylinders 45, 47, 49 and 51 control the front, rear, left and right positions of the front and rear glasses 15, whereas the horizontal air pressure cylinder 53 controls the horizontal states of the front and rear glasses 15 via the link 63 and the vertical air pressure cylinder 55 controls the vertical heights of the front and rear glasses 15. The position-controlled glass 15 is gripped by the gripper 59 in preparing for the subsequent processing steps.

In the glass lifting and turning device 9, as shown in FIGS. 17 to 19, the horizontal vertical positions of the front and rear glasses 15 are controlled by the horizontal air pressure cylinders 69 and 71 and the vertical air pressure cylinder 73 such the front and rear glasses 15 being in the "e" state is shifted into those being in the "d" state to mount the rubber dam 67 and the room mirror (not shown) onto the front and rear glasses 15.

The front and rear glasses 15 with the rubber dam 67 is then fed into the primer coating device 9 through the glass serve line 17.

In the primer coating device 9, as shown in FIGS. 20 and 21, the primer gun 81 coats primer onto the front and rear glasses 15. At this time, since the primer coating sensor 83 provided at the primer gun 81 by interposing the bracket 87 senses the primer coating state and transmits the sensing signals to the primer coating robot 85, the primer coating robot 85 can amend the coating positions and coat primer on the correct positions of the glass 15.

The primer-coated glass 15 is fed onto the carriage 19 with the ram runs by the unloading and loading robot 89 of the glass unloading and loading device 11. In particular, one robot is provided for the unloading and loading robot to perform the unloading and loading operation with respect to the front and rear glasses 15.

The carriage 19 carries the front and rear glasses 15 to the sealer coating and glass mounting device 13. In the sealer coating and glass mounting device 13, as shown in FIG. 22, the front and rear glasses 15 are relayed into the glass positioning members 91 by the relevant glass mounting robots 95, respectively.

In the glass positioning device 91, as shown in FIGS. 24 and 25, when the four direction air pressure cylinders 99, 101, 103 and 105 are operated, the front, rear, left and right directional positions of the front and rear glasses 15 are controlled to be mounted within the car body 97.

As shown in FIG. 23, the glass mounting robot 95 grips and feeds the position-controlled front and rear glasses 15 into the sealer-coating robot 93. Then, the sealer coating robot 93 coats sealer onto the primer-coated positions of the front and rear glasses.

Figure 26:
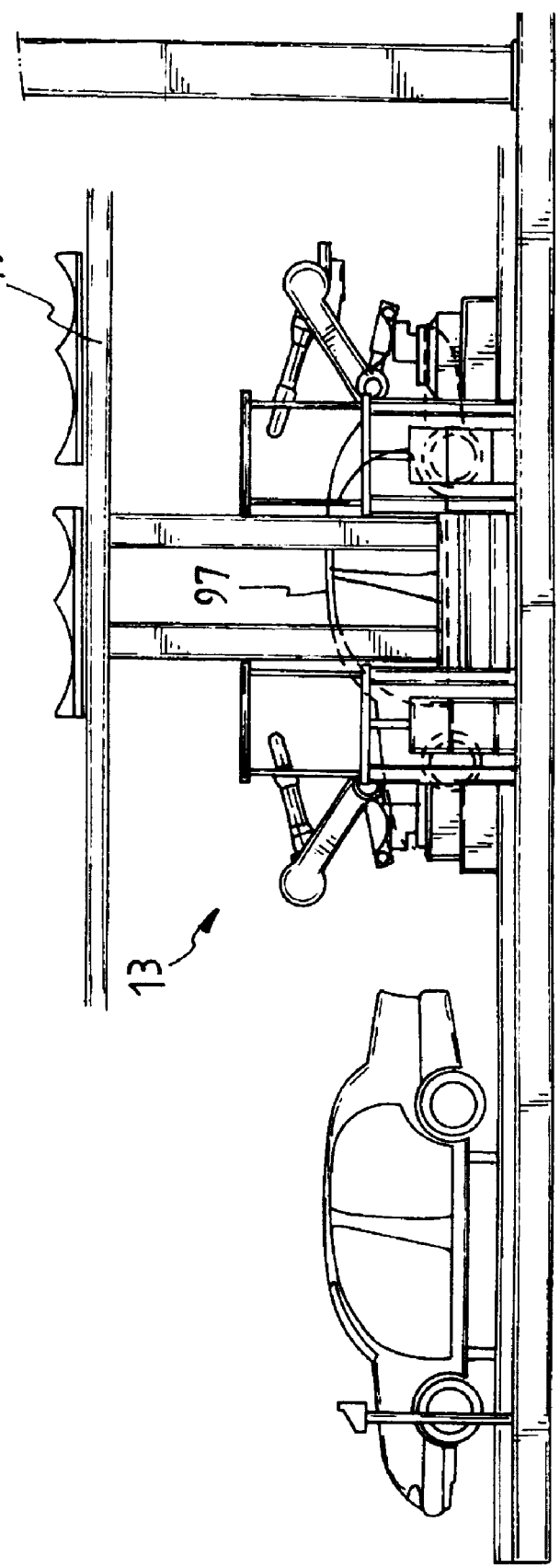
FIG. 26 is a view illustrating an operational state of the car glass mounting system shown in FIG. 1.

As shown in FIG. 26, the glass mounting robots 95 finally mounts the sealer-coated front and rear glasses within the car body 97.

As described above, the inventive car glass mounting device automates the overall car glass mounting process so that productivity and product quality can be elevated with lower production cost and stable working circumstance can be obtained.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A car glass mounting system comprising:
   a glass-species classifying and glass feeding device loaded with species-classified front and rear glasses each with a glass spacer to automatically select and feed the required species of front and rear glasses onto a glass serve line;
   a glass spacer separating device for separating the glass spacer from each of the front and rear glasses fed from the glass-species classifying and glass feeding device through the glass serve line;
   a glass lifting and positioning device for correctly controlling positions of the front and rear glasses fed from the glass spacer separating device through the glass serve line;
   a glass lifting and turning device for correctly controlling positions of the front and rear glasses fed from the glass lifting and positioning device through the glass serve line such that the front glass is attached with a first rubber dam and a room mirror, and the rear glass is attached with a second rubber dam;
   a primer coating device for coating primer onto the front and rear glasses fed from the glass lifting and turning device through the glass serve line while amending the coating positions of the front and rear glasses such that the primer coating layer is tightly attached with a sealer coating layer to be subsequently coated;
   a glass unloading and loading device for unloading the front and rear glasses fed from the primer coating device through the glass serve line and loading the front and rear glasses onto a carriage; and
   a sealer coating and glass mounting device for coating sealer onto the primer coated positions of the front and rear glasses fed from the glass unloading and loading device through the carriage and mounting the sealer-coated front and rear glasses within a car body.

2. The car glass mounting system of claim 1 wherein the glass-species classifying and glass feeding device comprises a stand loaded with the species-classified front and rear glasses, and a loading robot jointed with seven axes such that the loading robot selects the required front and rear glasses from the stand and feed the front and rear glasses onto the glass serve line with conveyers, the loading robot moving along a guide rail.

3. The car glass mounting system of claim 2 wherein the loading robot has a gripper with a front end and an ultrasonic wave sensor provided at the front end of the gripper, the ultrasonic wave sensor sequentially moving the gripper forward at high speeds, moving the gripper backward at a predetermined distance and again moving the gripper forward at low speeds.

4. The car glass mounting system of claim 1 wherein the glass spacer separating device comprises grippers for gripping the glass spacer surrounding each of the glasses, arms for rotating the grippers such that the glass spacer is removed from the glass, the arms being installed on a base stand by interposing a bracket, and an air pressure cylinder for giving the arms the required power for rotating the grippers, the air pressure cylinder being placed on a side of the bracket.

5. The car glass mounting system of claim 1 wherein the glass lifting and positioning device comprises front and rear air pressure cylinders for controlling front and rear positions of the front and rear glasses, left and right air pressure cylinders for controlling left and right positions of the front and rear glasses, a horizontal air pressure cylinder fixed to a base to define the front and rear positions of the front and rear glasses, a vertical air pressure cylinder for vertically moving the base such that heights of the front and rear glasses can be controlled independently of the front, rear and horizontal air pressure cylinders, and grippers for holding the position-controlled front and rear glasses at corresponding places.

6. The car glass mounting system of claim 1 wherein the glass lifting and turning device comprises first and second horizontal air pressure cylinders symmetrically arranged on a base such that as the rubber dam and the room mirror are attached to the front and rear glasses, the first and second horizontal air pressure cylinders can control horizontal positions of the front and rear glasses, a vertical air pressure cylinder fixed on a base stand while being connected to the base to move the base in a vertical direction, and grippers for holding the position-controlled front and rear glasses at corresponding places.

7. The car glass mounting system of claim 1 wherein the primer coating device comprises a primer gun for coating primer onto the front and rear glasses such that the primer coated layer can be tightly attached with sealer to be subsequently coated, a primer coating sensor for sensing whether primer issued from the primer gun is coated on the proper positions of the front and rear glasses, and a primer coating robot jointed with six axes such that the primer coating robot moves the primer gun to the primer coating positions on the front and rear glasses and amends the positions according to the signals of the primer coating sensor.

8. The car glass mounting system of claim 1 wherein the glass unloading and loading device is provided with an unloading and loading robot jointed with six axes such that the unloading and loading robot loads the primer-coated front and rear glasses onto the carriage with the ram-runs.

9. The car glass mounting system of claim 1 wherein the sealer coating and glass mounting device comprises a glass positioning member for controlling positions of the front and rear glasses such that sealer can be coated onto the prime-coated positions of the front and rear glasses and the sealer coated front and rear glasses can be correctly mounted within the car body, a sealer coating robot having externally servo double axes such that sealer can be sprayed and coated onto the primer-coated positions of the front and rear glasses controlled by the glass positioning member, and a glass mounting robot jointed with six axes for moving the front and rear glasses during the sealer spraying operation and mounting the sealer-coated front and rear glasses within the car body.

10. The car glass mounting system of claim 9 wherein the glass positioning member comprises front and rear air pressure cylinders fixed on a base stand by interposing a rack and a pinion such that the cylinders control front and rear positions of the front and rear glasses, and left and right air pressure cylinders fixed on the base stand while being connected to an extended portion of the rack such that the left and right positions of the glasses can be controlled.

* * * * *